United States Patent [19]
Simon

[11] 3,748,743
[45] July 31, 1973

[54] BOWLING BALL HANDGRIP GAUGE AND DRILLING JIG FOR USE THEREWITH

[76] Inventor: Fred G. Simon, 906 N. 15th Ave., Melrose Park, Ill.

[22] Filed: July 27, 1971

[21] Appl. No.: 166,427

Related U.S. Application Data

[63] Continuation-in-part of Ser. No. 30,836, April 20, 1970, abandoned.

[52] U.S. Cl. ............................................. 33/174 F
[51] Int. Cl. ......................... A61b 5/10, G01b 5/24
[58] Field of Search .................................. 33/174 F

[56] References Cited
UNITED STATES PATENTS

| | | | |
|---|---|---|---|
| 2,709,853 | 6/1955 | Rassner | 33/174 F |
| 3,137,074 | 6/1964 | Jesonis | 33/174 F |
| 2,799,943 | 7/1957 | Shetler | 33/174 F |
| 3,271,870 | 9/1966 | Blaker et al. | 33/174 F |
| 3,081,550 | 3/1963 | Jacksich et al. | 33/174 F |

Primary Examiner—Louis R. Prince
Assistant Examiner—Charles E. Phillips
Attorney—Dominik, Knechtel & Godula

[57] ABSTRACT

A dummy bowling ball including a pair of finger adjustment assemblies and a thumb adjustment assembly which can be adjustably positionable in accordance with the natural span of a bowler's hand and the pitch and angle to the natural grip of the bowler.

3 Claims, 16 Drawing Figures

PATENTED JUL 31 1973 3,748,743
SHEET 1 OF 3
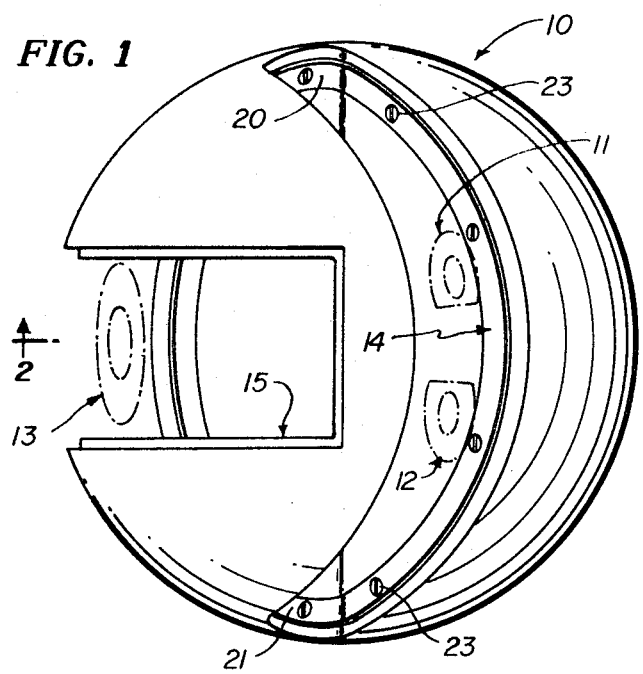
FIG. 1
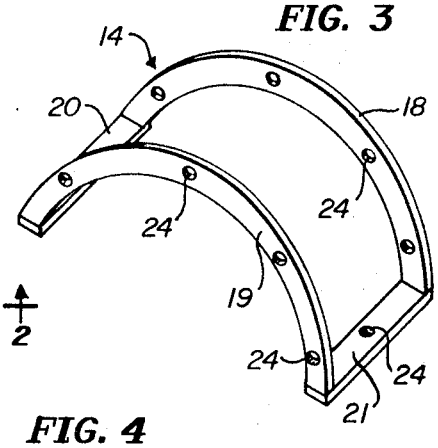
FIG. 3
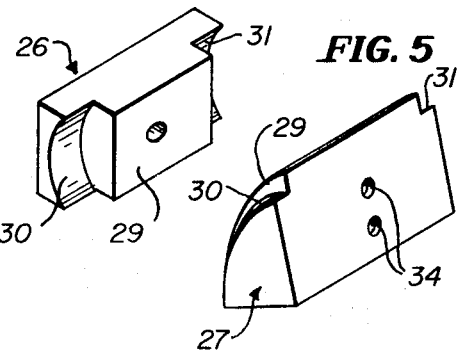
FIG. 4 FIG. 5
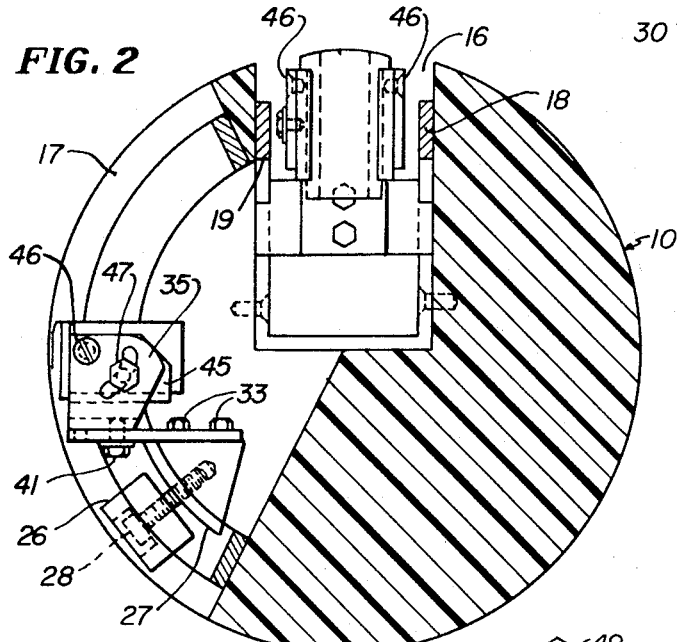
FIG. 2
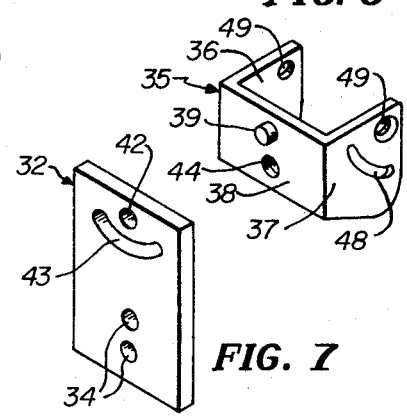
FIG. 6
FIG. 7
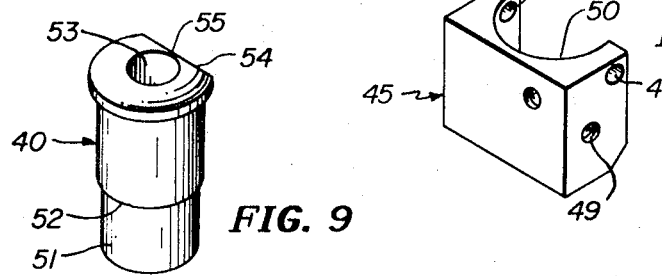
FIG. 9 FIG. 8
INVENTOR
Fred G. Simon
BY
Dominik, Knechtel & Godula
ATTYS.

INVENTOR
Fred G. Simon

BY
Dominik, Knechtel & Godula
ATTYS.

INVENTOR
Fred G. Simon

BY Dominik, Knechtel & Godula
ATTYS.

BOWLING BALL HANDGRIP GAUGE AND DRILLING JIG FOR USE THEREWITH

This is a continuation-in-part of my copending application Ser. No. 30,836, filed Apr. 20, 1970, now abandoned.

This invention relates to a dummy bowling ball for measuring the handgrip of a bowler and to the apparatus associated therewith for drilling holes in a bowling ball in accordance with the individual natural grip of a bowler.

Numerous different types of dummy bowling balls for forming custom-made bowling balls presently are available; however, each of them is generally objectionable for one reason or another. In particular, all of these dummy bowling balls employ movable finger members of adjustable size openings, which finger members are movable to set the span between the finger and thumb holes and to set the pitches or angles of entry of the finger and thumb holes. The principle objections to these dummy bowling balls are the inability to set a minimum web thickness of a narrow width between the finger holes, and the costly and complicated manner in which adjustments are made.

Accordingly, it is an object of the present invention to provide an improved dummy bowling ball for measuring the handgrip of a bowler to drill holes in a bowling ball in accordance with the individual natural grip of a bowler.

Another object is to provide an improved dummy bowling ball of the above-described type of a construction whereby it can be easily and quickly adjusted to set the span between the finger and thumb holes and to set the pitches or angles of entry of the finger and thumb holes.

A still further object is to provide an improved dummy bowling ball of the above-described type having means whereby the web thickness between the finger holes can be easily and quickly adjusted.

A still further object is to provide an improved drilling jig for use with such an improved dummy bowling ball for drilling holes in a bowling ball.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 1 is a perspective view of a dummy bowling ball exemplary of a first embodiment of the invention;

FIG. 2 is a partial sectional view, taken generally along lines 2—2 of FIG. 1;

FIG. 3 is a perspective view of one of the two track guides in the dummy bowling ball;

FIGS. 4 and 5 are perspective views of the two halves of the clamp assembly of the dummy bowling ball;

FIGS. 6, 7 and 8 are perspective views of the three members of the finger and thumb adjustment assemblies of the dummy bowling ball;

FIG. 9 is a perspective view of one of the finger and thumb inserts of the dummy bowling ball;

Similar reference characters refer to similar parts throughout the several views of the drawings.

Figure 10:
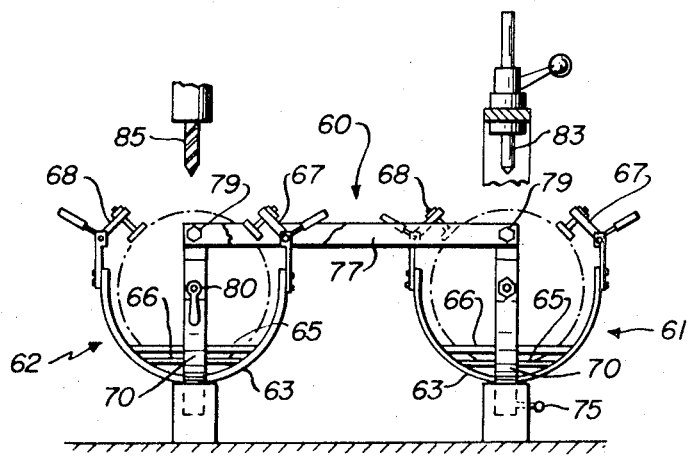
FIGS. 10, 11 and 12 are a side plan view, an end plan view, and a top plan view of an improved drilling jig for use with the dummy bowling ball of FIGS. 1–9, for drilling holes in a bowling ball.
Figure 11:
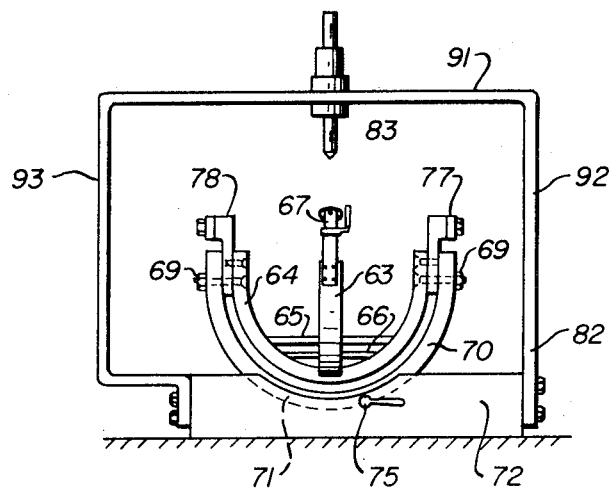
Figure 12:
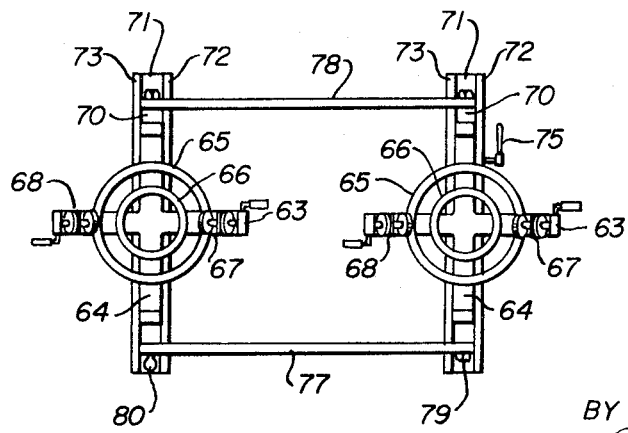
Figure 13:
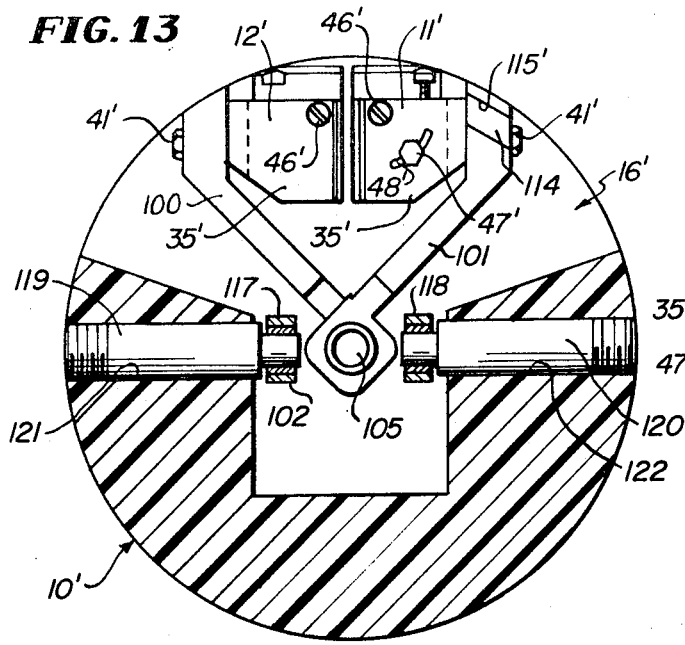
FIG. 13 is a transverse sectional view of a dummy bowling ball having finger and thumb adjustment assemblies exemplary of a second embodiment of the invention.

Referring now to the drawings, there is illustrated a dummy bowling ball 10 having two finger adjustment assemblies 11 and 12 and a thumb adjustment assembly 13. These finger and thumb adjustment assemblies 11–13 are of identical construction so that they are completely interchangeable, and so that the number of piece-parts for constructing them is kept at a minimum. This latter factor also substantially reduces fabrication costs, for obvious reasons. The ball 10 also has a pair of guide tracks 14 and 15 which are disposed within elongated, arcuate-shaped openings 16 and 17 formed in the ball 10, the opening 17 being perpendicular to the opening 16. These guide tracks 14 and 15 also are of identical construction, and therefore provide the same advantages as the assemblies 11–13.

The guide tracks 14 and 15, as can be best seen in FIG. 3, each is formed of a pair of arcuate-shaped track members 18 and 19 having end members 20 and 21 which fixedly support the track members 18 and 19 in spaced-apart, parallel relationship, and thereby form an integral unit which can be easily installed within the openings 16 and 17 in the ball 10. These openings 16 and 17 and the width and length of the guide tracks 14 and 15 are proportioned so that the latter are snugly received in the openings 16 and 17 and so that when assembled the ends of the finger and thumb inserts 40 of the assemblies 11–13 are substantially flush with the exterior surface of the ball 10. The arrangement also is such that the ends of these inserts 40 always remain substantially flush, as the assemblies 11–13 are slidably adjusted in the guide tracks 14 and 15, as described more fully below. The guide tracks 14 and 15 are fixedly secured within the openings 16 and 17 by means of threaded screws 23 (FIG. 1) extended through the apertures 24 formed therein.

Each of the finger and thumb adjustment assemblies 11–13, as can be best seen in FIGS. 4–8, includes a clamp assembly having an upper clamp portion 26 and a lower clamp portion 27 which are adapted to be releasably clamped to the track members 18 and 19, by means of a threaded bolt 28, as seen in FIG. 2. These upper and lower clamp portions 26 and 27 each have alignment portions 29 of a width to be snugly and slidably received between the track members 18 and 19 so as to maintain the alignment of the assemblies 11–13, and arcuate slide portions 30 and 31 which extend laterally from the opposite sides of the alignment portions 29 and are formed to slidably engage with the top and bottom edges of the track members 18 and 19.

A rectangular support plate 32 (FIG. 7) is fixedly secured to the lower clamp portion 27 by means of threaded bolts 33 extended through apertures 34 formed therein and in the lower clamp portion 27, as can be best seen in FIG. 2. These upper and lower clamp portions 26 and 27 each have alignment portions 29 of a width to be snugly and slidably received between the track members 18 and 19 so as to maintain the alignment portions 29 of a width to be snugly and slidably received between the track members 18 and 19 so as to maintain the alignment of the assemblies 11-13, and arcuate slide portions 30 and 31 which extend laterally from the opposite sides of the alignment portions 29 and are formed to slidably engage with the top and bottom edges of the track members 18 and 19.

A rectangular support plate 32 (FIG. 7) is fixedly secured to the lower clamp portion 27 by means of threaded bolts 33 extended through apertures 34 formed therein and in the lower clamp portion 27, as can be best seen in FIG. 2. A bracket 35 having a pair of pivot arms 36 and 37 which are fixed in parallel, spaced relationship by an end member 38 is affixed to the support plate 32, by means of a pivot pin 39 and a threaded bolt 41 (FIGS. 2 and 6). The pivot pin 39 is received within a pivot aperture 42 formed in the support plate 32, and the threaded bolt 41 is extended through an arcuate-shaped aperture 43 in the support plate 32 and threaded into a threaded aperture 44 in the end member 38 of the bracket 35. With this arrangement, the bracket 35 can be pivotally, angularly, adjustably positioned with respect to the support plate 32, and then locked in position by tightening the bolt 41, as expalined more fully below.

An insert receiver 45 is pivotally affixed by means of threaded screws 46 (FIG. 2) between the pivot arms 36 and 37 of the bracket 35, and is adapted to be locked in an adjusted position by means of a threaded bolt 47 (FIG. 2) extended through an arcuate-shaped aperture 48 formed in the pivot arm 37 and threadedly received within a threaded aperture 49 (FIG. 8) in the insert receiver 45. Apertures 49 are provided in the bracket 35 and in the insert receiver 45 for receiving the threaded screws 46.

The insert receiver 45 has a cavity 50 therein which is generally opened on one side thereof, for slidably and frictionally receiving therein finger and thumb inserts 40. These finger and thumb inserts 40 are generally cylindrical-shaped, as can be best seen in FIG. 9, and have a reduced diameter portion 51 which forms a shoulder 52 which seats atop the upper rim of the insert receiver 45 to position the finger and thumb inserts 40 in the insert receivers. The finger and thumb inserts 40 each have an interior cavity 53 of a different diameter so that an insert which suits a bowler can be selected and fitted within the insert receivers.

As can be best seen in FIGS. 1 and 9, the finger and thumb inserts 40 also are formed so as to provide a flat surface 54 on the exterior peripheral surface thereof and a very narrow web thickness 55 between the cavities 53 therein and the flat surfaces. The finger inserts 40 are positioned within the insert receivers 45 so that the flat surfaces 54 thereon are in a facing relationsip. When disposed in this fashion, the finger adjustment assemblies 11 and 12 can be adjustably positioned with these flat surfaces 54 in mating engagement, as illustrated in FIG. 1, leaving only a very narrow web between the two finger adjustment assemblies 11 and 12. This arrangement therefore permits the web thickness between the finger adjustment assemblies 11 and 12 to be adjusted to virtually the narrowest width possible, so that the web thickness between the finger holes in a bowling ball can be established in accordance with the desires of virtually any bowler.

In using the dummy bowling ball 10, the proper size finger and thumb inserts 40 are selected and inserted within the insert receivers 45 of the appropriate one of the finger and thumb adjustment assemblies 11, 12 and 13. Initially, the latter are loosely assembled in the dummy bowling ball so that the fingers and thumb can be inserted within the finger and thumb inserts and the latter in conjunction with the assemblies 11-13 adjustably positioned to establish the proper span between the thumb and fingers. The threaded bolts 28 then are tightened to lock the clamp portions 26 and 27 and hence the finger and thumb assemblies 11, 12 and 13 in position. When the fingers and thumb are inserted into the finger and thumb inserts 40, the proper pitch or angle of entry for the finger and thumb holes is established also. When they are adjusted in accordance with the natural or desired grip, the threaded screws 41 and 47 are tightened to lock the finger and thumb adjustment assemblies 11, 12 and 13 in position. The fingers and thumb now can be withdrawn from the finger and thumb inserts 40, and the finger and thumb adjustment assemblies 11, 12 and 13 will remain fixed so as to preserve the established grip.

The bowler now can practice swing the dummy bowling ball 10, to determine whether the grip is the one that he desires. If the established setting of the finger and thumb adjustment assemblies 11, 12 and 13 is as he desires, the dummy bowling ball 10 is placed in a drilling jig 60 (FIGS. 7-9) and used as a pattern for operating the latter to drill finger and thumb holes in corresponding positions and at corresponding angles of pitch in a regular bowling ball.

The drilling jig 60 includes a pair of gimbal structures 61 and 62 for receiving and supporting the dummy bowling ball 10 and a bowling ball to be drilled, respectively. Each of the gimbal structures 61 and 62 includes a pair of arcuate arms 63 and 64 which are offset 90° with respect to one another and are affixed together. A pair of ring members 65 and 66 are affixed within these arcuate arms 63 and 64 and are formed to provide a seat for securely receiving the dummy ball 10 and the ball to be drilled. A pair of adjustable clamps 67 and 68 are affixed to ends of the arcuate arms 63 of each of the gimbal structures 61 and 62, for locking the dummy ball and the ball to be drilled securely within the gimbal structures.

The opposite ends of the arcuate arms 64 of each of the gimbal structures 61 and 62, as can be best seen in FIG. 8, are pivotally affixed by means of pivot pins 69 to arcuate slide arms 70. These arcuate slide arms 70 are slidably and adjustably retained within a track 71 (FIG. 9) formed between two spaced apart vertical frame members 72 and 73, so that the gimbal structures 61 and 62 can be rotated about a vertical axis. A lock 75 is provided for locking the gimbal structures 61 and 62 in any adjusted position along this vertical axis. A pair of connecting members 77 and 78 are affixed between the arcuate arms 64 so that the gimbal structures 61 and 62 are slaves to one another.

These connecting members 77 and 78 are pivotally affixed by means of pivot pins 79 to the arcuate arms 64 so that the gimbal structures 61 and 62 also are pivotally adjustable about a horizontal axis, about the same pivot points defined by the pivot pins 69. It can be seen that by moving the connecting members 77 and 78 to the right or left, in FIG. 1, the gimbal structures 61 and 62 will pivot about the pivot pins 69. A lock 80 is provided for locking the gimbal structures 61 and 62 in any adjusted position along this horizontal axis.

A U-shaped locator arm 82 is fixed to the frame members 72 and 73 so that it is axially aligned with the track 71 in which the arcuate slide arm 70 of the gimbal structure 61 slidably rides. This locator arm 82 supports an adjustable locator pin 83 which is adapted to be received within the finger and thumb inserts 40 in the dummy ball 10, as the latter is adjusted in the gimbal structure 61. The horizontally disposed arm member 90 advantageously is pivotally affixed to the upper ends of the two vertical arm members 91 and 92 in a fashion such that it can be pivotally moved about one or the other of the arm members 91 and 92, so that it can be moved out of the way when the ball 10 is placed within the gimbal structure 61.

This locator pin 83 is precisely located with respect to the drill bit 85 which is used to drill the finger and thumb holes in the bowling ball supported within the gimbal structure 62. Accordingly, when the dummy bowling ball 10 is affixed within the gimbal structure 61 and the latter adjusted so that the locator pin 83 is disposed within one of the finger or thumb inserts 40, a similarly oriented hole will be drilled in the bowling ball disposed within the gimbal structure 62. In this manner, each of the finger and thumb holes can be drilled in the bowling ball supported within the gimbal structure corresponding exactly to the position of the finger and thumb inserts 40 in the dummy bowling ball 10.

Referring now to FIGS. 13-16, there is illustrated another dummy bowling ball 10' which is generally of the same construction as the ball 10. In these figures, the corresponding parts thereof are indicated with primed reference numerals. The principal distinctions between the balls 10 and 10' are in the manner in which finger and thumb adjustment assemblies 11'-13' are adjustably mounted, and in the manner in which the finger and thumb inserts 40' are lockingly affixed within the insert receivers 45'.

In this case, it can be seen that the brackets 35 supporting the insert receivers 45' are affixed to pivot arms 100-102. The finger adjustment assemblies 11 and 12 are affixed to the pivot arms 100 and 101, and the latter are in turn pivotally supported on a support shaft 103. The support shaft 103 is threadedly retained within a shaft cavity 104 formed axially in the ball 10', and has a reduced diameter shaft portion 105 disposed so as to extend perpendicularly within the arcuate shaped opening 16 in the ball 10'. A bearing 106 is affixed to this shaft portion 105.

Figure 14:
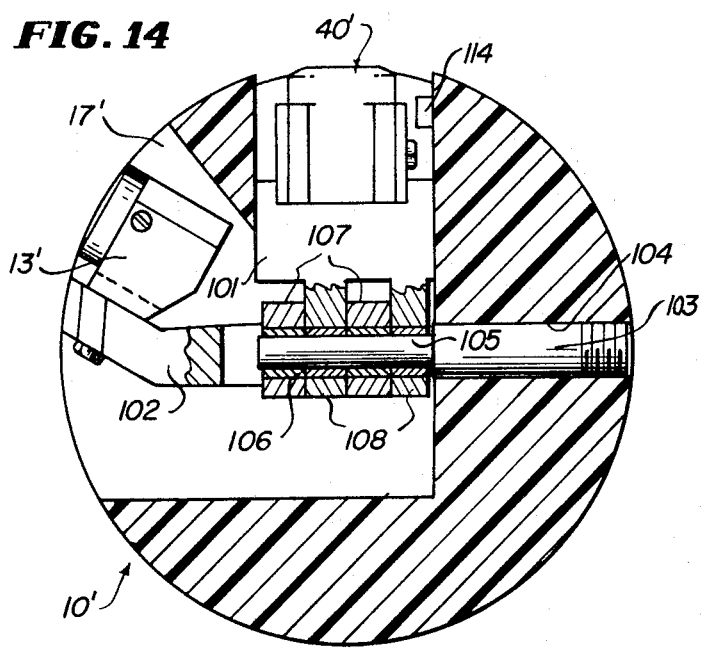
FIG. 14 is another transverse sectional view of the ball of FIG. 13 taken along an axis 90° displaced from the view of FIG. 13.

As can be best seen in FIG. 14, the pivot arms 100 and 101 have interlocking, spaced legs 107 and 108 thereon, respectively, having aligned bores therein for receiving the shaft portion 105. With this arrangement, the finger adjustment assemblies 11' and 12' can be pivotally adjusted about the support shaft 103, within the opening 16 in the ball 10', to adjust them as desired.

Figure 15:
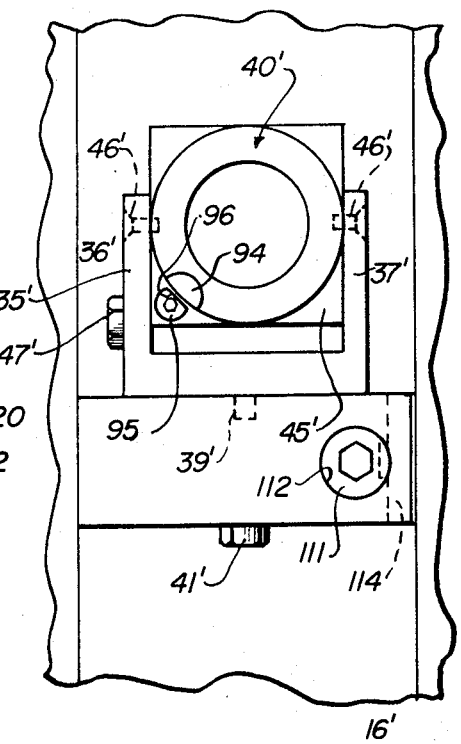
FIG. 15 is a top plan view of a portion of the ball of FIG. 13, illustrating one of the finger adjustment assemblies.
Figure 16:
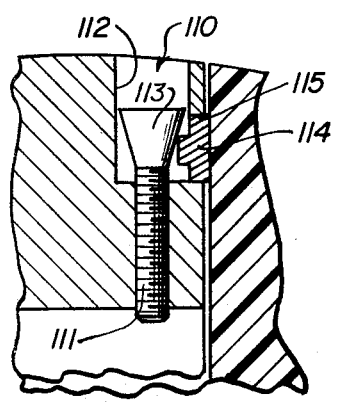
FIG. 16 is a partial sectional view illustrating the locking assembly for one of the finger adjustment assemblies.

Once positionally adjusted, the finger adjustment assemblies 11' and 12' are locked in position by means of a screw-type cam lock assembly 110, as best seen in FIGS. 15 and 16. These lock assemblies 110 each include a threaded screw 111 disposed within a cavity 112 formed in the upper end of the pivot arms 100 and 101, and having a tapered or conical camming head 113 on its upper end. This camming head 113 engages a camming lock 114 seated within a slot 115 formed in the side edge wall of the pivot arms, and as it is threaded downwardly it cams the camming lock 114 into frictional engagement with the side wall of the opening 16 in the ball 10'. Each of the pivot arms 100-102 is locked in position in the same fashion.

The end of the pivot arm 102 supporting the thumb adjustment assembly 13' is formed with two spaced-apart legs 117 and 118 (FIG. 13), each of which has an aligned bore in it for receiving the reduced diameter shaft portions of two support shafts 119 and 120. These support shafts 119 and 120 are threadedly retained within shaft cavities 121 and 122 formed axially in the ball 10', in a fashion such that the thumb adjustment assembly 13' is pivotally movable in the opening 17', perpendicular to the finger adjustment assemblies 11' and 12'.

The insert receivers 45' are pivotally affixed between the pivot arms 36' and 37' of the brackets 35', as in the case of the ball 10. The pivot pins 39' are received within pivot pin cavities formed in the pivot arms 100-102, and a threaded bolt 41' is extended through an arcuate-shaped aperture in the pivot arm. This permits the brackets 35' to be pivotally, angularly, adjustably positioned with respect to the pivot arms and then locked in position, generally in the same manner as described above.

The insert receivers 45' have cavities 50' therein for receiving the finger and thumb inserts 40'. In this embodiment, the finger and thumb inserts 40' have a small arcuate-shaped recessed lock cavity 94 formed in the upper end thereof. A lock screw 95 threadedly retained within the insert receivers 45' has a flat 96 on its edge which when positioned as shown will permit the finger and thumb inserts 40' to be inserted in the cavities 50'. The inserts 40' then are locked therein simply by turning the lock screws 95 so that the annular rims thereof engage with the bottom walls of the lock cavities 94.

In using the dummy bowling ball 10', the proper size finger and thumb inserts 40' are selected and inserted within the insert receivers 45' of the appropriate one of the finger and thumb adjustment assemblies 11', 12' and 13'. Initially, the latter are loosely assembled in the dummy bowling ball so that the fingers and thumb can be inserted within the finger and thumb inserts and the latter in conjunction with the assemblies 11'-13' adjustably positioned to establish the proper span between the thumb and fingers. The lock bolts 111 then are tightened to cam the camming locks 114 into frictional engagement, to lock the finger and thumb assemblies 11', 12' and 13' in position. When the fingers and thumb are inserted into the finger and thumb inserts 40', the proper pitch or angle of entry for the finger and thumb holes is established also. When they are adjusted in accordance with the natural or desired grip, the threaded screws 41' and 47' are tightened to lock the finger and thumb adjustment assemblies 11', 12' and 13' in position. The fingers and thumb now can be withdrawn from the finger and thumb inserts 40', and the finger and thumb adjustment assemblies 11', 12' and 13' will remain fixed so as to preserve the established grip.

The bowler can now practice swing the dummy bowling ball 10', to determine whether the grip is the one that he desires. If the established setting of the finger and thumb adjustment assemblies 11', 12' and 13' is as he desires, the dummy bowling ball 10 is placed in a drilling jig 60 (FIGS. 7–9) and used as a pattern for operating the latter to drill finger and thumb holes in corresponding positions and at corresponding angles of pitch in a regular bowling ball.

It will thus be seen that the objects set forth above, among those made apparent from the preceding description, are efficiently attained and certain changes may be made in the above construction. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A dummy bowling ball comprising three pivot arms; a pair of finger adjustment assemblies and a thumb adjustment assembly affixed to respective ones of said pivot arms; a first elongated opening in said dummy bowling ball in which said thumb adjustment assembly is disposed; a second elongated opening in said dummy bowling ball in which said finger adjustment assemblies are disposed, said second elongated opening being disposed substantially perpendicular to and in spaced relation from said first elongated opening; a first support shaft for pivotally supporting said pivot arms and said finger adjustment assemblies affixed thereto within said second elongated opening, each of said finger adjustment assemblies being independently pivotally positioned within said second elongated opening to permit the distance between the two finger adjustment assemblies to be adjusted for an individual's grip; a pair of support shafts for pivotally supporting said pivot arm and said thumb adjustment assembly affixed thereto within said first elongated opening, said thumb adjustment assembly being pivotally positioned within said first elongated opening to permit the distance between said finger adjustment assemblies and said thumb adjustment assembly to be adjusted for the natural span of the individual's grip; said finger and thumb adjustment assemblies being of identical construction and each comprising a generally U-shaped bracket pivotally affixed to said pivot arm, an insert receiver adapted to receive therein a finger or thumb insert pivotally affixed to said bracket, and means for locking both said bracket and said insert receiver in an angularly adjusted position whereby said finger and thumb adjustment assemblies are adjustably positionable in accordance with the pitch and angle to the natural grip of the individual; and finger and thumb inserts having a cavity therein for the receipt of a finger or thumb removably disposed within each of said insert receivers of said finger and thumb adjustment assemblies.

2. The dummy bowling ball of claim 1, wherein said brackets are generally U-shaped having a pair of spaced-apart pivot arms between which said insert receivers are pivotally supported, said means for locking said insert receivers in angular adjusted positions comprising an arcuate-shaped aperture formed in one pivot arm of said bracket, and a threaded screw extended through said aperture and threadedly received in said insert receiver, said threaded screw upon being tightened locking said bracket and said insert receiver together in an angularly adjusted position.

3. The dummy bowling ball of claim 1, further including a screw-type cam lock assembly affixed to each of said pivot arms, said lock assemblies each including a threaded screw having a camming head on its upper end and a cam lock engaged by said camming head as said threaded screw is manipulated to force it into frictional engagement with the side wall of the elongated openings to lock said pivot arm in position.

* * * * *